United States Patent
Mamie et al.

(10) Patent No.: US 9,387,791 B2
(45) Date of Patent: Jul. 12, 2016

(54) TENSION ABSORBER

(71) Applicant: Spanset Inter AG, Wollerau (CH)

(72) Inventors: Andre Mamie, Wadenswil (CH); Lars Dohse, Aachen (DE)

(73) Assignee: Spanset Inter AG, Wollerau (CH)

( * ) Notice: Subject to any disclaimer, the term of this patent is extended or adjusted under 35 U.S.C. 154(b) by 0 days.

(21) Appl. No.: 14/401,341

(22) PCT Filed: Apr. 25, 2013

(86) PCT No.: PCT/EP2013/058569
§ 371 (c)(1),
(2) Date: Nov. 14, 2014

(87) PCT Pub. No.: WO2013/174607
PCT Pub. Date: Nov. 28, 2013

(65) Prior Publication Data
US 2015/0123414 A1    May 7, 2015

(30) Foreign Application Priority Data

May 25, 2012 (DE) .......................... 10 2012 010 256

(51) Int. Cl.
*A44B 1/04* (2006.01)
*B60P 7/08* (2006.01)
*B66C 1/12* (2006.01)

(52) U.S. Cl.
CPC *B60P 7/0823* (2013.01); *B66C 1/12* (2013.01)

(58) Field of Classification Search
CPC ......... A47C 7/465; B60P 7/0823; A41F 1/00; A47B 1/04
USPC .............. 297/74; 24/300, 301, 298, 17 B, 18; 59/79.1, 84; 294/74
See application file for complete search history.

(56) References Cited

U.S. PATENT DOCUMENTS

| | | | |
|---|---|---|---|
| 496,696 A * | 5/1893 | Nash ................... | A47G 25/0657 24/298 |
| 852,180 A * | 4/1907 | Hoffman .............. | A47C 21/022 24/115 H |
| 3,561,069 A * | 2/1971 | Asseo et al. ............... | A41F 1/00 24/298 |
| 4,769,875 A | 9/1988 | Hartman | |
| 5,673,464 A | 10/1997 | Whittaker | |
| 7,275,396 B2 * | 10/2007 | MacHock .............. | A44C 7/009 24/298 |
| 8,215,094 B2 | 7/2012 | Wienke et al. | |

(Continued)

FOREIGN PATENT DOCUMENTS

| | | |
|---|---|---|
| AT | 412096 B | 9/2004 |
| WO | 0017085 A1 | 3/2000 |

(Continued)

*Primary Examiner* — Jose V Chen
(74) *Attorney, Agent, or Firm* — The Webb Law Firm

(57) ABSTRACT

A tension absorber produced from a flexible strand which is only loadable under tension and which tension absorber possesses the advantages of a chain formed from strand material but can be easily and cost-effectively produced. The strand is folded into three or more loop sections. Proceeding from the beginning of the strand a succeeding loop section arranged offset in the direction of the end of the strand follows each preceding loop section arranged offset in the direction of the beginning, until the last loop section has been reached. Each loop section has a loop which encloses a loop opening. At least one bow is formed from the strand by guiding a succeeding loop section by its loop through the loop opening of a preceding loop section arranged adjacent to it.

15 Claims, 4 Drawing Sheets

(56) References Cited

U.S. PATENT DOCUMENTS

| | | | | |
|---|---|---|---|---|
| 8,454,484 B2 * | 6/2013 | Keen | ............... | A63B 21/02 24/298 |
| 8,590,116 B2 * | 11/2013 | Dahl | ............... | D07B 1/18 24/300 |
| 2001/0001340 A1 * | 5/2001 | Libecco | ............... | B60P 7/0823 24/300 |
| 2006/0075610 A1 * | 4/2006 | Buchanan | ............... | B65D 63/1018 24/300 |

FOREIGN PATENT DOCUMENTS

| WO | 2004063460 A2 | 7/2004 |
|---|---|---|
| WO | 2008089798 A1 | 7/2008 |

\* cited by examiner

TENSION ABSORBER

CROSS-REFERENCE TO RELATED APPLICATIONS

This application is the United States national phase of International Application No. PCT/EP2013/058569 filed Apr. 25, 2013, and claims priority to German Patent Application No. 10 2012 010 256.9 filed May 25, 2012, the disclosures of which are hereby incorporated in their entirety by reference.

BACKGROUND OF THE INVENTION

1. Field of the Invention

The invention relates to a tension absorbing means (tension absorber) produced from a flexible strand which is only loadable under tension. Such tension absorbing means are used in practice for bracing, holding, securing, tensioning, lifting, fastening and stowing goods and persons. The application of force usually occurs via two attachment points, between which the tension absorbing means is tensioned. In the case where the tension absorbing means of the type mentioned here is used for lifting goods, these are referred to as "sling gear" in the technical language.

2. Description of Related Art

Ropes, chains, straps, slings and suchlike can be used as tension absorbing means. Ropes and straps have the advantage that they can be produced cost-effectively as continuous products, from which the respective rope or strap can be cut to the length required. This is accompanied by the disadvantage that after having been cut to length the length of the ropes and straps can only be shortened by taking appropriate action, such as by forming knots or loops which can impair the functional reliability, or with the aid of additional components, such as hooks, eyelets and suchlike. Additional measures also have to be taken to store away the excess rope or strap length properly in each case. These measures are particularly laborious if the respective rope or strap has a certain inherent stiffness and correspondingly can only be wound or folded over large radiuses.

Chains, on the other hand, as a result of them being distinctly multi-jointed can be draped without any problems even in the most confined spaces if their chain links consist of inelastic material. Furthermore, the effective length of chains used as tension absorbing means can be easily adapted to the requirements imposed in practice by attaching a suitable attachment element, such as a hook or shackle, for example for coupling to the goods item to be respectively fastened, to that chain link whose distance from the one end of the chain corresponds to the distance between the attachment points to be joined together for fastening by means of the chain. The individual chain links can also be easily used to couple further tension absorbing means to the chain. A disadvantage of chains, however, is that their manufacture requires a lot of effort. This applies irrespective of which material they are produced from. Hence, the chain links always have to be prefabricated individually. In addition, at least every second chain link has to initially remain open, so that when the chain is put together it can be joined to the chain links between which it is arranged. After the chain has been put together, the previously open chain links have to be closed.

Highly stressed chains used as tension absorbing means are also nowadays usually produced from solid steel material. The chain links are generally produced by forging or bending. However, chains are also in use which are manufactured from a flexible strand material. In the case of such chains, the individual chain links are, for example, produced from textile or wire sections which are formed into rings. The advantages of chains over conventional ropes or straps used as tension absorbing means lie in the fact that they can be easily shortened and can also then be easily stored away if they are produced from materials which only have a slight bendability. Particularly if the chains consist of textile material their low weight and as a consequence their easy manageability add to their ability to be stored away easily. Furthermore, it has proved advantageous in practice that when chains consisting of textile material come into contact with other components the risk of damage is very much less than with chains consisting of steel or other hard materials. In addition, chains consisting of textile material are insensitive to moisture and therefore are suitable for fields of application, in which chains consisting of conventional steel would be exposed to a high level of corrosion.

However, these advantages are accompanied by the disadvantage also in the case of chains whose links are formed from strand material that these kind of chains can only be manufactured with a large amount of effort. Irrespective of which flexible material the strand consists of, from which the individual chain links are formed, the joining places where the individual links of the chain are in each case joined to form a ring prove to be the weak points which in practice would require regular inspection and could impair the load-bearing capacity of chains consisting of textile material.

SUMMARY OF THE INVENTION

Against this background of the previously explained prior art, the object of the invention was to create a tension absorbing means which possessed the advantages of a chain formed from strand material but, at the same time, could be easily and cost-effectively produced.

This object is achieved according to the invention by a tension absorbing means formed according to Claim 1.

Advantageous embodiments and variants of the invention are specified in the dependent claims and in common with the general concept of the invention are explained in detail below.

A tension absorbing means according to the invention has consequently been produced from a flexible strand which is only loadable under tension. According to the invention, this strand is folded into three or more loop sections, so that proceeding from the beginning of the strand a succeeding loop section arranged offset in the direction of the end of the strand follows each preceding loop section arranged offset in the direction of the beginning, until the last loop section has been reached. Each loop section has a loop which encloses a loop opening. At least one bow is formed from the strand provided with the loop sections by guiding a succeeding strand section by its loop through the loop opening of a preceding loop section arranged adjacent to it.

Of course, the tension absorbing means according to the invention advantageously has a larger number of bows formed in the manner according to the invention. The bows of a tension absorbing means according to the invention comparable to a chain link in each case enclose an opening which can be used for attaching an additional component, such as a hook used to shorten the effective length of the tension absorbing means, or for coupling further tension absorbing means.

Although a tension absorbing means according to the invention is formed from a single strand, it can as a consequence be used like a chain formed from flexible material which is composed of individual chain links. The interlooping of a single strand which takes place in the manner according to the invention enables a tension absorbing means according to the invention to be produced from a continuous product. During the production of strand-like tension absorbing means, in each case a strand is separated from this continuous product, this strand in each case having the effective length required for producing a tension absorbing means of a certain length. The separated strand is subsequently folded into the loop sections which immediately after that are fixed and interlooped forming the bows.

The manufacture of a tension absorbing means according to the invention can therefore be carried out for by far the most part purely automatically in a continuous pass, so that large quantities of a tension absorbing means according to the invention can be produced cost-effectively and in a short period of time. The invention in this way combines the practical advantages of a chain with the cost and production advantages which accompany strand-shaped tension absorbing means, such as ropes or straps.

In principle, every material which is sufficiently deformable through bending and, at the same time, loadable under tension is suitable as a strand for manufacturing a tension absorbing means according to the invention. Hence, it is, for example, conceivable for the tension absorbing means to be manufactured from wire rope or suchlike. However, optimum performance characteristics with, at the same time, simple manufacture ensue when the strand, from which the respective tension absorbing means according to the invention is manufactured, is a textile material. Thus, for example, kern-mantel rope, laid rope, flat woven strap, tubular woven strap, hollow braid, compact braid or parallel non-crimp fibre fabric are suitable as the strand material.

One embodiment of a tension absorbing means according to the invention which optimises the manufacture and load-bearing capacity involves each loop section having two longitudinal sections which in each case abut with their one end on the loop of the respective loop section and are durably firmly joined together lying adjacent to one another over their length. Thus, the individual loop sections are in this case fixed by joining the longitudinal sections of the respective loop sections abutting on one another firmly together. The longitudinal sections of the loop sections can, for example, be joined in a force-fit or form-fit manner, wherein both joining methods can, of course, complement one another. With suitable materials, a firmly bonded connection is also conceivable, for example by welding or joining by adhesive. The join of the longitudinal sections must be durable such that it also reliably withstands the stresses occurring under rough environmental conditions. For this purpose, the longitudinal sections of the loop sections can in each case be joined by means of a joining element which grips through the longitudinal sections. Such joining elements can be rivets, eyelets, screws and suchlike. Equally, threads or wires fall within the scope of joining means which grip through the longitudinal sections, by means of which the longitudinal sections of the loop sections are in each case sewed together. The longitudinal sections to be respectively joined can equally be spliced together.

Alternatively or in addition to effecting the join by means of the joining elements gripping through the longitudinal sections, the longitudinal sections of the loop sections can be durably joined by means of a joining element encompassing the respective longitudinal sections. Such a joining element can be a clamp, a sleeve or suchlike, which press the longitudinal sections of the respective loop section to be joined together against one another. The join of the longitudinal sections can equally, for example, be effected by wrapping by means of a suitable thread or wire.

For certain applications, it can be advantageous if firstly a longer strand-like beginning section is provided at the beginning of the tension absorbing means according to the invention which is not interlooped. The beginning section in question can be available to connect to certain components or can be used to make handling of the tension absorbing device easier.

The chain properties of a tension absorbing means according to the invention can, however, be utilised in an optimum way if a first bow of the strand is formed by the first preceding loop section assigned to the beginning of the strand and a succeeding loop section arranged adjacent to it, wherein the beginning of the strand, from which the tension absorbing means is produced, forms the beginning of the one longitudinal section of the first loop section. In this case, a bow is present directly at the beginning of the tension absorbing means, which like the first chain link of a chain can be hooked up to an attachment element, such as a hook, shackle or suchlike, or can be thrown over a post or another attachment point.

In principle, it is possible for the bow formation according to the invention only to be carried out over certain longitudinal sections of the tension absorbing means. A simple strand section, which is formed like a rope or strap, is then in each case present between the interlooped longitudinal sections. However, if the chain properties of a tension absorbing means according to the invention are to be able to be utilised in an optimum way, it is advantageous if the strand is interlooped at regular intervals by guiding each succeeding loop section through the loop opening of the preceding loop section, which in each case is arranged closest adjacent in relation to it, in each case forming a bow.

The same purpose is served if the segments of the strand between the loop sections are of equal length. Forming bow openings of the same size at regular intervals results in the length of the loop sections also being the same.

From the manufacturing point of view, it is additionally advantageous if the length of the longitudinal sections of the loop sections is the same.

The tension absorbing means according to the invention can easily be provided with other functional elements. Thus, it can be advantageous, for example, to provide spacers or stabilisers on the tension absorbing means, in order to make handling it easier. Wear and tear possibly occurring under certain operating conditions can also be counteracted by providing the tension absorbing means with a special protective or bearing element which has an increased resistance to wear and tear or enables the tension absorbing means to slide particularly well on the respective attachment point or component, with which the respective section of the tension absorbing means comes into contact. Similarly, the loops of the loop sections can, for example, be reinforced by thimbles or other components having the same effect, in order to prevent premature wear and tear here.

In order to make the coupling of the tension absorbing means according to the invention to an attachment point easier, a fastening section can be formed on the end of the strand, which is designed to be coupled to a component. The component in question can, for example, be an attachment element which, on the one hand, is coupled to the fastening section and, at the same time, grips through the loop opening of the last loop section assigned to the end of the strand. For this purpose, the fastening section can, for example, also be formed as a loop section with a loop opening, through which the respective attachment element grips.

BRIEF DESCRIPTION OF THE DRAWINGS

The invention is explained in more detail below by means of exemplary embodiments.

DESCRIPTION OF THE INVENTION

Figure 3:
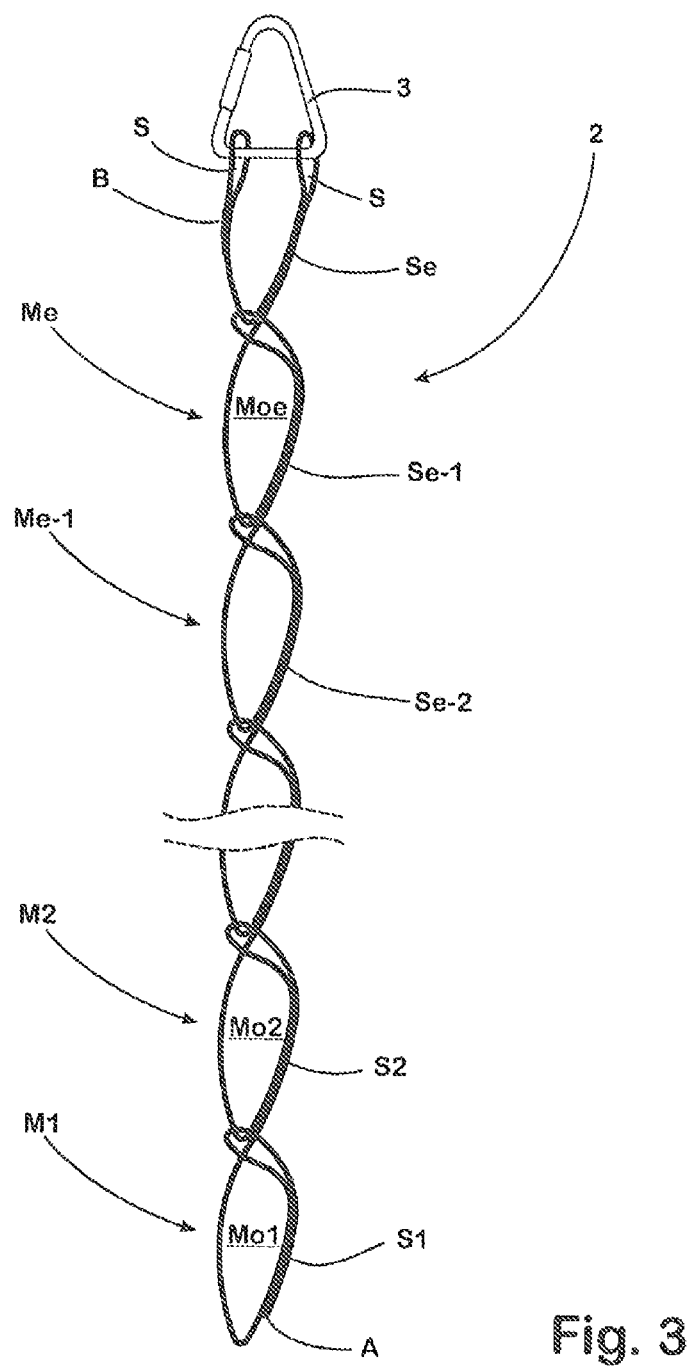
FIG. 3 schematically shows the tension absorbing means formed from the strand according to FIG. 1.

The strand 1, from which the chain-like tension absorbing means 2 illustrated in FIG. 3 is manufactured, in this example described here is a textile strap which is flat woven from textile fibres in a conventional way. The strand 1 has been cut to the required length from a continuous product which is woven in a conventional way by a machine (which is not shown here) in a continuous process flow.

Proceeding from its beginning A, the strand 1 is folded into loop sections S1, S2, S3, S4, ..., Se−1, Se. The loop sections S1, ..., Se in each case comprise a longitudinal section La, which is on the beginning side and is assigned to the beginning A of the strand 1, and a longitudinal section Le, which is on the end side and is assigned to the end E of the strand 1, as well as a loop S which is formed between the longitudinal sections La,Le and which encloses a loop opening O. The beginning A of the strand forms the beginning of the beginning-side longitudinal section La of the first loop section S1 assigned to the beginning A. The longitudinal sections La,Le of each loop section S1, ..., Se are durably firmly joined together by seams N effected in the conventional way.

The loop sections S1, ..., Se adjacent to one another are in each case attached to one another by a segment T1, T2, ..., Te of the strand 1. Correspondingly, proceeding from the beginning A of the strand 1 a "succeeding loop section" S2 ... follows each loop section S1 ... until the last loop section Se assigned to the end E of the strand 1 is reached. Similarly, a "preceding loop section" S1 ..., which in each case is arranged closest adjacent in relation to the loop section S2, ... and offset in the direction of the beginning A, is assigned to each succeeding loop section S2, ....

A fastening section B is formed at the end E of the strand 1, which in the example described here is formed in exactly the same way as the loop sections S1, ..., Se. Correspondingly, the fastening section B also has a longitudinal section La on the beginning side and a longitudinal section Le on the end side, as well as a loop S arranged in between which encloses a loop opening O. The end E of the strand 1 forms the end of the end-side longitudinal section Le of the fastening section B.

Figure 1:
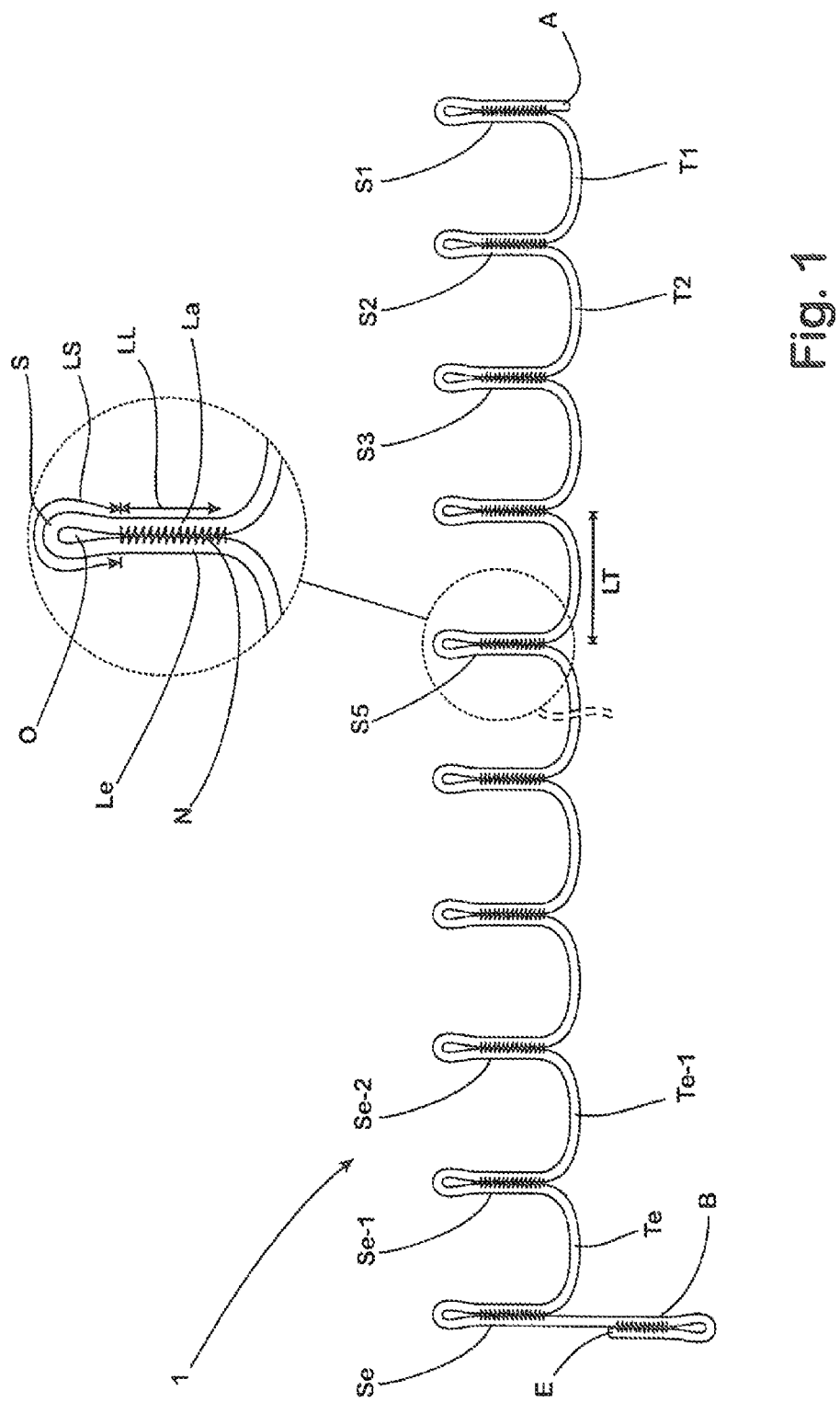
FIG. 1 schematically shows a textile strand folded into loop sections and an end section.
Figure 2:
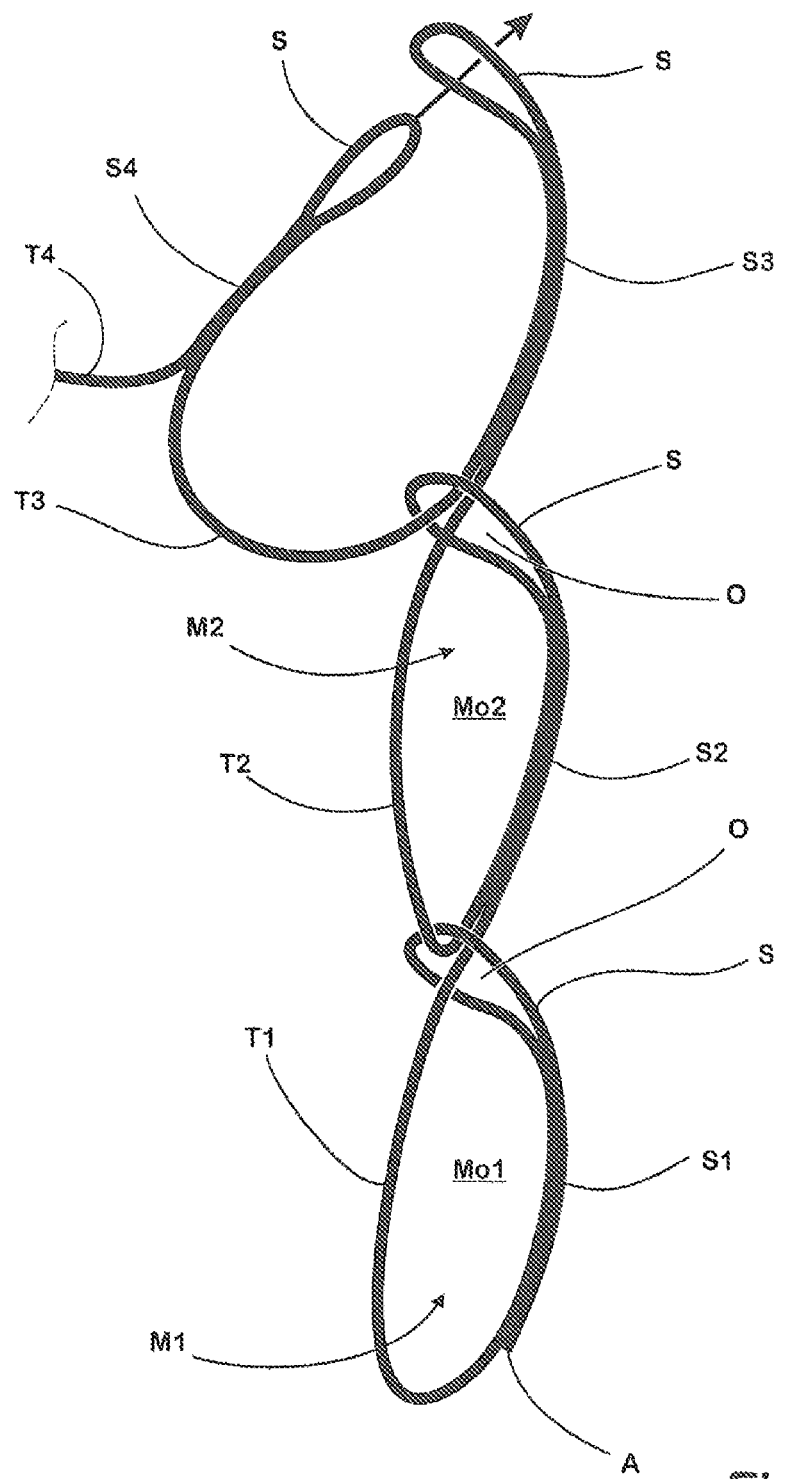
FIG. 2 schematically shows the strand according to FIG. 1 during production of a chain-like tension absorbing means.

The longitudinal sections La,Le and the loops S of the loop sections S1, ..., Se and of the fastening section B in each case have the same length LL and LS. Equally, the segments T1, ..., Te are of equal length in each case, wherein the length LT of the segments T1, ..., Te is not shown to scale in FIG. 1.

In order to produce the tension absorbing means 2, the strand 1 provided with the loop sections S1, ..., Se is interlooped. For this purpose, in the first step only the succeeding loop section S1 in relation to the loop section S1 proceeding from the beginning A of the strand 1 is slipped through the loop S of the preceding loop section S1 in relation to the loop section S2. A first bow M1 is thereby formed which encloses a first bow opening Mo1 assigned to the beginning A. The segment T2 of the strand joining the loop section S2 and the loop section S3 following in the direction of the end E of the strand 1, is then guided around the loop S and only the loop section S3 is slipped through the loop S of the loop section S2. A second bow M2 is thereby formed which encloses the second bow opening Mo2. This process is continued forming the bows M3 ... Me for the loop sections S3, ..., Se, until the last loop section Se is slipped through the loop S of the loop section Se−1 preceding it and the last bow Me is formed.

Subsequently, an attachment element 3, which, as illustrated in FIG. 3, can be a screw triangle, for example, is slipped through the loops S of the last loop section Se and of the fastening section B. The attachment element 3 ensures that the loop section Se maintains its position and that the tension absorbing means 2 does not automatically unloop. The attachment element 3 can be used for directly coupling the tension absorbing means 2 to an attachment point (not shown here). Equally, however, for using the tensioning means 2 the attachment element 3 can be removed and replaced by another attachment element. This then also grips through the loops S of the fastening section B and the last loop section Se at the same time in an optimum way. However, it is also conceivable to allow an attachment element in each case to grip in one of the loops S of the fastening section B and the loop section Se, in order to connect to the respective goods to be transported.

Therefore, with the tension absorbing means 2 according to the invention, a product is available which is formed from a textile strand 1, the cross-sectional area of which is very small in relation to its linear extension. The strand 1 can be continually produced for example directly from the weaving loom with subsequent fixing of the loops and interlooping, wherein it is either produced according to the length required in each case or can be cut to the effective length from a continuous product without interrupting the manufacturing process.

Loop sections S1-Se are formed along the strand 1 in a periodic sequence and fixed by a suitable joining technique, from which in terms of interlooping in each case a succeeding loop section S2-Se is guided through the loop S of the loop section S1-Se−1 in each case preceding it. A termination is formed at the end of the interlooping process by hooking the loop S of the last loop section Se and the loop S of the fastening section B into an end fitting, the attachment element 3, or into another component.

In this way, the tension absorbing means 2 formed in such a manner can absorb forces between the strand termination formed by the attachment element 3 and any bow M1-Me. In the process, a part of the force introduced is in each case conducted past the loops from one bow into the next, so that the join of the longitudinal sections La,Le, which is formed by the respective seam N, of the loop sections S1-Se is only subjected to very low loads in relation to the total force introduced.

Figure 4:
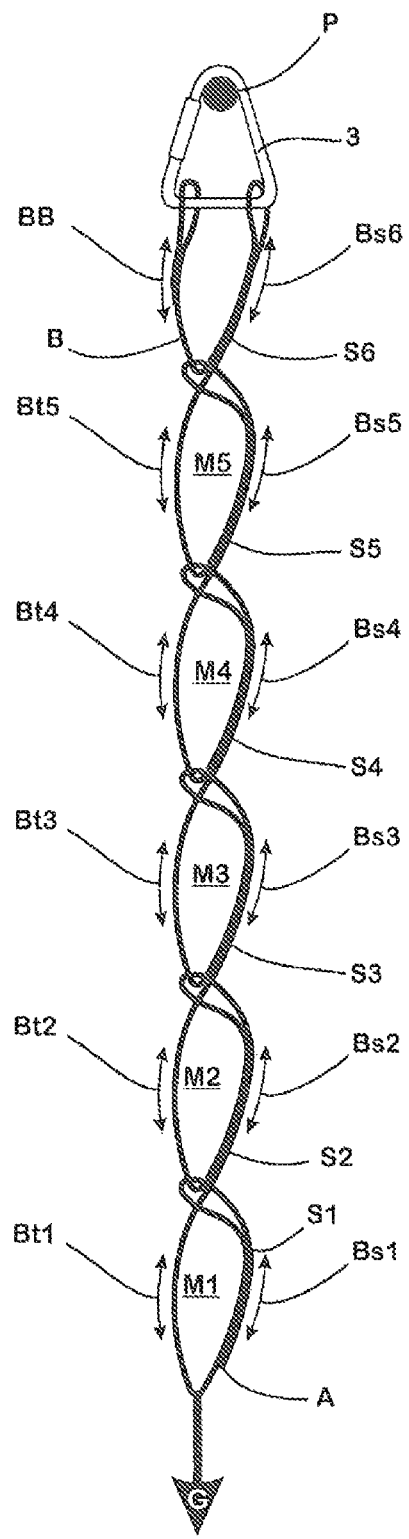
FIG. 4 schematically shows the force flow in a tension absorbing means formed according to FIG. 3 when lifting a load G.

In FIG. 4, a tension absorbing means 2 according to the invention suspended on an attachment point P is illustrated when a load G is lifted. The tension absorbing means 2 comprises five bows M1-M5 formed in the previously explained way. The suspension point P can, for example, be the hook of a crane (not shown here). Under the impact of the load G, the segments T1-T5, the fastening section B and the loop sections S1-S6 absorb the load proportions Bt1-Bt5, BB and BS1-BS6, wherein the load proportions BS1-BS6 of the loop sections S1-S6 divide into the same parts on the longitudinal sections La,Le of the respective loop section S1-S6.

In Table 1, the load proportions Bt1-Bt5, BB and BS1-BS6 are specified for the segments T1-T5, the fastening section B and the loop sections S1-S6 for the case where the tension absorbing means 2 absorbs the load G on its own. It has been shown that in the case of the bows M3-M5 following the second bow M2, as well as in the case of the last loop section S6 and the fastening section B, the respective loop sections S3-S6 in each case absorb about two thirds of the load G and the respectively assigned segment T3-T5 and the fastening section B absorb the remaining load. The segments T3-T5 and the longitudinal sections La,Le of the loop sections S3-S6 are hence essentially evenly loaded.

TABLE 1

(Load = G)

| Load proportion | | Load proportion | |
|---|---|---|---|
| T1 | Bt1 = 50% | S1 | BS1 = 50% |
| T2 | Bt2 = 50%/2 = 25% | S2 | BS2 = 50%/2 + 50% = 75% |
| T3 | Bt3 = 75%/2 = 37.5% | S3 | BS3 = 75%/2 + 25% = 62.5% |
| T4 | Bt4 = 62.5%/2 = 31.25% | S4 | BS4 = 62.5%/2 + 37.5% = 68.75% |
| T5 | Bt5 = 68.75%/2 = 34.38% | S5 | BS5 = 68.75%/2 + 31.25% = 65.62% |
| B | BB = 65.62%/2 = 32.81% | S6 | BS6 = 65.62%/2 + 34.38% = 67.19% |

In Table 2, the load proportions Bt1-Bt5, BB and Bs1-Bs6 absorbed by the segments T1-T5, the fastening section B and the loop sections S1-S6 for a tension absorbing means 2 are specified for the case where the load G is borne by two identical tension absorbing means 2. Here, it has been shown that already from the second bow M2 and with the last loop section S6 and the fastening section B the respective loop sections S2-S6 in each case absorb about two thirds of the load G and the respectively assigned segment T2-T5 and the fastening section B absorb the remaining load. Hence, in this load case, the segments T2-T5 and the longitudinal sections La,Le of the loop sections S2-S6 are essentially evenly loaded.

TABLE 2

(Load = G/2)

| Load proportion | | Load proportion | |
|---|---|---|---|
| T1 | Bt1 = 25% | S1 | Bs1 = 25% |
| T2 | Bt2 = (50% + 25%)/2 = 37.5% | S2 | Bs2 = (50% + 25%)/2 + 25% = 62.5% |
| T3 | Bt3 = 62.5% = 31.25% | S3 | Bs3 = 62.5%/2 + 37.5% = 68.75% |
| T4 | Bt4 = 68.75%/2 = 34.38% | S4 | Bs4 = 68.75%/2 + 31.25% = 65.62% |
| T5 | Bt5 = 65.62%/2 = 32.81% | S5 | Bs5 = 65.62%/2 + 34.38% = 67.19% |
| B | BB = 67.19%/2 = 33.59% | S6 | Bs6 = 67.19%/2 + 32.81% = 66.41% |

REFERENCE SYMBOLS

1 textile strand available as a woven strap
2 chain-like tension absorbing means
3 attachment element
A beginning of the strand 1
B fastening section of the strand 1
Bt1-Bt5 load proportions absorbed by the segments T1-T5
Bs1-Bs6 load proportions absorbed by the loop sections S1-S5
BB load proportion absorbed by the fastening section
E end of the strand 1
G load to be lifted
La respective beginning-side longitudinal section of the loop sections S1-Se
Le respective end-side longitudinal section of the loop sections S1-Se
LL length of the longitudinal sections La,Le
LS length of the loops S
LT length of the segments T1-Te
M1-Me bows of the tension absorbing means 1
Mo1-Moe respective bow opening of the bows M1-Me
N the seam joining longitudinal sections La,Le of the respective loop section S1-S6
O loop opening of the respective loop S
P attachment point
S respective loop of the loop sections S1-Se
S1-Se loop sections of the strand 1
T1-Te Segments of the strand 1

The invention claimed is:

1. A tension absorber produced from a flexible strand which is only loadable under tension,
   wherein the strand is folded into three or more loop sections arranged along a length of the strand, each loop section having two longitudinal sections,
   non-looped segments extend between adjacent loop sections,
   each loop section has a loop which encloses a loop opening, and in that
   at least one bow is formed from the strand by guiding the longitudinal sections of a succeeding loop section through the loop opening of a preceding loop section arranged adjacent to it.

2. The tension absorber according to claim 1, wherein the two longitudinal sections are joined together and lying adjacent to one another over their length.

3. The tension absorber according to claim 2, wherein a first bow of the strand is formed by a first preceding loop section closest to a first end of the strand and a succeeding loop section arranged adjacent to the first preceding loop section, and the first end of the strand, from which the tension absorber is produced, forms at least a portion of one longitudinal section of the first preceding loop section.

4. The tension absorber according to claim 2, wherein longitudinal sections of the loop sections are in each case joined together by a joining element which grips through the longitudinal sections.

5. The tension absorber according to claim 4, wherein the longitudinal sections of the loop sections are in each case sewed together.

6. The tension absorber according to claim 2, wherein the longitudinal sections of the loop sections are in each case joined together by means of a joining element encompassing respective longitudinal sections.

7. The tension absorber according to claim 2, wherein a length of the longitudinal sections of the loop sections is the same.

8. The tension absorber according to claim 1, wherein the strand is interlooped at regular intervals by guiding each succeeding loop section through the loop opening of the preceding loop section which in each case is arranged closest adjacent in relation to it, in each case forming a bow.

9. The tension absorber according to claim 1, wherein a fastening section is formed at an end of the strand.

10. The tension absorber according to claim 9, wherein an attachment element is coupled to both the fastening section and the loop opening of a loop section closest to an end of the strand.

11. The tension absorber according to claim 1, wherein the strand is a textile strand.

12. The tension absorber according to claim 1, wherein the strand is a rope or a strap.

13. The tension absorber according to claim 1, wherein the non-looped segments of the strand extending between the loop sections are of equal length.

14. The tension absorber according to claim 1, wherein a length of the loop sections is the same.

15. The tension absorber according to claim 1, wherein the strand is provided with an additional functional element.

* * * * *